G. S. PERFATER.
Root Cutter.
No. 84,374.
Patented Nov. 24, 1868.
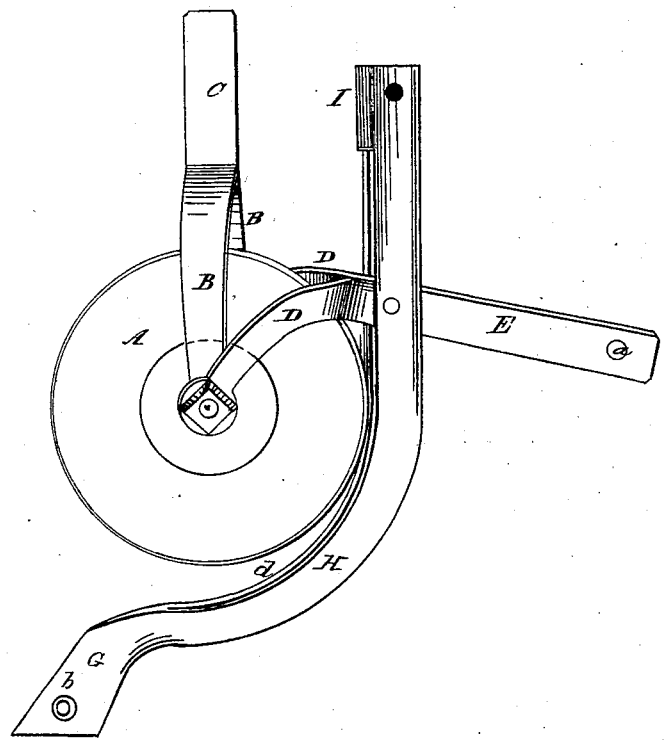

G. S. PERFATER, OF CAMP POINT, ILLINOIS.

Letters Patent No. 84,374, dated November 24, 1868.

---

IMPROVEMENT IN ROOT-CUTTER.

---

The Schedule referred to in these Letters Patent and making part of the same.

---

*To all whom it may concern:*

Be it known that I, G. S. PERFATER, of Camp Point, in the county of Adams, and State of Illinois, have invented a new and useful Improvement in Root-Cutters; and I do hereby declare that the following is a full, clear, and exact description thereof, which will enable others skilled in the art to make and use the same, reference being had to the accompanying drawings, forming part of this specification, in which the figure represents a perspective view of my invention.

Similar letters of reference indicate like parts.

The object of this invention is to provide an attachment for cutting small roots, vines, and stubble, in front of plows, and is designed to be attached to a plow, in the manner hereinafter to be set forth.

It consists of a revolving cutter, working in the rear and above a fixed cutting-point, and also working in a slit in the curved shank, forming part of and supporting the fixed cutter, whereby the roots and vines will be first partially severed by the fixed cutter, and afterward completely severed by being drawn between the revolving cutter and the aforesaid curved shank, in which the latter works.

In the drawings, the revolving cutter A is hung in the forks D D of the plate E, which latter is pivoted in the curved shank H, as shown.

This plate is formed with a hole, *a*, for affixing it to the standard of the plow with a bolt and nut, or it may be affixed to any other part of the plow which affords a suitable surface for attaching it.

There should be several holes in the standard or other equivalent part, and the said holes should be arranged vertically, in order that the rear end of the plate may be raised or lowered, to adjust the revolving cutter more or less deeply into the slit *d*, or completely out of the same, as may be desired.

The plate E acts as a stay or brace, to hold the revolving cutter stiffly, and is also assisted in this function by the forked plate C B B, the forks B B of which furnish bearings for the shaft of the revolving cutter and the extension C of which is clamped by a suitable clip to the plow-beam.

The fixed cutter G is formed by the junction of the two parts of the curved shank H, the said parts being welded together with a steel plate between them, to furnish the cutting-edge.

The two parts forming the shank extend upward, in the rear of the revolving cutter, and with circular curve, which conforms, more or less, to that of the revolving cutter.

The two parts forming the shank are sufficiently approximated to form a slit, *d*, in which the revolving cutter works, and the action of the revolving cutter, in encountering roots or vines, is to press them against the shank, and to sever them as they rest crosswise upon the latter.

The upper end of the shank is formed with a suitable fork, I, for affixing it to the plow-beam.

Thus, with my invention, I accomplish the cutting of roots, vines, and other stubble, which is encountered by the plow in breaking up heavy prairie-land.

The point G is formed with a bolt-hole, *b*, for affixing it to the landside of the plow, and set forward far enough to bring the revolving cutter in front of the cutting-edge of the plow.

Having thus described my invention,

I claim as new, and desire to secure by Letters Patent—

1. The revolving cutter A and fixed cutter G, when constructed and operating substantially as described.

2. The pivoted plate E and curved shank H, having a slit, *d*, in combination with the revolving cutter A and fixed cutter G, substantially as described.

G. S. PERFATER.

Witnesses:
SAML. S. MORSE,
G. M. HESS.